United States Patent [19]

Zollman et al.

[11] Patent Number: 4,878,127

[45] Date of Patent: Oct. 31, 1989

[54] LASER ENGRAVING MACHINE FOR PREPARING ROTARY SCREEN PRINTING SCREENS

[75] Inventors: Peter M. Zollman; Brendon T. Pollard; Andrew D. Birch, all of Surrey, England

[73] Assignee: Zed Instruments Ltd., Hersham, England

[21] Appl. No.: 275,997

[22] Filed: Nov. 25, 1988

[30] Foreign Application Priority Data

Nov. 25, 1987 [GB] United Kingdom ............... 8727613

[51] Int. Cl.[4] ..................... B23K 9/00; B05C 17/0; B41C 1/14
[52] U.S. Cl. .............................. 358/299; 346/76 L; 219/121.68; 219/121.84; 101/128.4; 101/127
[58] Field of Search .............. 346/76 L, 138; 358/299; 101/128.21, 128.4, 127; 219/121.67, 121.68, 121.69, 121.84

[56] References Cited

U.S. PATENT DOCUMENTS

| | | | |
|---|---|---|---|
| 3,759,800 | 9/1971 | Reinke | 101/128.4 |
| 3,763,030 | 10/1973 | Zimmer | 101/128.4 |
| 4,808,790 | 2/1989 | Ruckl | 219/121.68 |

Primary Examiner—H. Broome
Assistant Examiner—Scott A. Rogers
Attorney, Agent, or Firm—Sughrue, Mion, Zinn, Macpeak and Seas

[57] ABSTRACT

A laser engraving machine for engraving rotary printing screens includes a shaft (1) having one end connected to a rotary drive (3) for rotating the shaft (1), two end ring assemblies (7, 8) at least one (8) of which is movable along the shaft (1) and which are arranged to locate concentrically and fix opposite ends of a rotary printing screen (2) to the shaft (1). The machine also includes a laser engraving device including a head (4) movable backwards and forwards parallel to the axis of rotation of the shaft (1) to engrave a printing screen (2) and a support (9, 13). The support (9, 13) is movable along the screen (2) with the laser engraving head (4) to provide local support for the screen (2) so that the part being engraved is supported at a constant predetermined position with respect to the head (4) of the laser engraving device. Preferably the suppport includes a ring (9, 13) having a cylindrical supporting surface and the ring (9, 13) has a radius of curvature slightly greater than that of the screen (2) and has its axis slightly offset radially inwards from the axis of rotation of the shaft (1).

10 Claims, 2 Drawing Sheets

LASER ENGRAVING MACHINE FOR PREPARING ROTARY SCREEN PRINTING SCREENS

BACKGROUND TO THE INVENTION

Printing screens for screen printing textiles are typically made of perforated cylindrical sleeves of nickel having a thickness of 0.1 mm, a diameter of between 200 and 400 mm and a length of one to three meters.

Conventionally such screens are coated with a photosensitive lacquer which covers the outer surface of the screen and fills all of its perforations. To produce an ink transmitting pattern the lacquer is exposed to ultra-violet light through a transparent sheet carrying an opaque pattern which is usually a negative resulting from a photographic process. Portions of the photosensitive lacquer which are exposed to ultra-violet light remain after development of the lacquer whilst the portions of the photosensitive lacquer which lie beneath the opaque regions are not exposed to ultra-violet light and, during development, are removed to open the perforations in the screen. This produces a pattern on the screen of areas which transmit ink and areas that do not transmit ink.

Recently it has been proposed that, instead of using a photographic process to produce a pattern of ink transmitting and non-transmitting regions on the screen they are patterned using a laser engraving device to ablate the lacquer from regions of the screen that are required to transmit ink. Conventionally the perforated screen is slid onto a correspondingly sized metal mandrel which is then rotated about its longitudinal axis. A laser engraving head moves along parallel to the screen to ablate the lacquer from the perforations. One difficulty with this process is in removing the screen from the mandrel after it has been engraved. Debris from the engraving process which is blasted through the perforations tends to lock the screen onto the underlying mandrel.

In an attempt to overcome this difficulty and take up tolerances in the diameter typically of the order of 300 microns, an inflatable mandrel has been used in which a thin nickel sleeve is located around the outside of the mandrel and then the nickel screen slipped over the outside of the nickel sleeve. The space between the nickel sleeve and the mandrel is then inflated to expand the nickel sleeve and lock the screen in place. After the screen has been engraved, the screen is deflated and this allows sufficient clearance between the screen and the sleeve to enable the screen to be removed, even though debris has been blasted through the perforations in between the sleeve and the mandrel. This technique however suffers from the further difficulty that the screen is not supported concentrically whilst it is engraved and this means that the patterns are not recorded faithfully during the engraving of the printing screen.

SUMMARY OF THE INVENTION

According to this invention a laser engraving machine for engraving rotary printing screens includes a shaft having one end connected to a rotary drive for, in use, rotating the shaft, two end ring assemblies at least one of which is movable along the shaft and which are arranged to locate and fix opposite ends of the rotary printing screen, a laser engraving device including a head movable backwards and forwards parallel to the axis of rotation of the shaft, in use, to engrave a printing screen mounted on the shaft and a support, the support being movable along the screen with the laser engraving head to provide local support for the screen so that the part being engraved is supported at a constant predetermined position with respect to the head of the laser engraving device.

The support preferably includes a ring having a cylindrical supporting surface. The support may not be a complete cylindrical surface and, in this case it supports only the region of the screen around the part to be engraved. It may support this region so that it is strictly cylindrical with its axis of curvature and coaxial with the axis of rotation of the shaft. Alternatively it may have a radius of curvature slightly different from that of the screen and have its axis slightly offset from the axis of rotation of the shaft.

When the support surface has the form of a ring it preferably is arranged to rotate with the screen. The support ring may include means to adjust its effective diameter whilst maintaining the location of its axis constant. The support ring may include a large number of bearing surfaces formed on an iris diaphragm mechanism or may be formed as a bearing surface around the outside of an expansible ring similar to a wiper ring of a piston in an internal combustion engine. Alternatively the support surface of the support ring may include air outlet ports distributed around it and the machine includes means to provide a flow of air through the outlet ports to provide an air cushion between the support ring and the surface of the printing screen. Such an air cushion is sufficient to accommodate the variations in dimensional tolerance of such a screen whilst maintaining the surface of the screen to be engraved at an accurate location with respect of the head of the engraving device.

The support ring may be mounted on the shaft and, in this case, means are provided to drive the support ring along the external surface of the shaft. These means may include an endless loop passing along the middle of the shaft and returning along its outer surface, the endless loop being connected to the ring and being driven by a motor to drive the support ring along the shaft.

When the support ring is mounted on the shaft and includes means to provide an air cushion the nominal external diameter of the support ring may correspond to that of the smallest screen within the tolerance range and the means to supply air is arranged to emit sufficient air adjacent the engraving head to function as an effective air bearing and a greater quantity of air remote from the engraving head so that the screens larger than the smallest balloon out in a direction away from the engraving head.

Alternatively, the support ring may surround the outside of the printing screen and have an internal bearing surface which engages the outer surface of the printing screen. In this case the support ring is typically mounted on the laser engraving head and moves along the printing screen with the laser engraving head. Also in this case when the support includes means to provide an air cushion, the support ring may have a size so that it is a sliding fit on the largest screen within the tolerance range and the means to supply air is arranged to emit sufficient air adjacent the engraving head to function as an effective air bearing and a greater quantity remote from the engraving head to push the screen towards the support adjacent the engraving head.

The support ring may include a number of size adjusting collars to adjust the diameter of its support surface so that the laser engraving machine can accommodate printing screens of different nominal diameter. However it is preferred that the support ring is readily detachable and interchangeable to enable rings of different size to be used with screens of different nominal diameter. Preferably the support ring is not located at precisely the same axial position as the laser engraving head but preferably it leads the laser engraving head by a small distance typically one or two millimeters. This is close enough to provide effective support for the screen and yet by the support ring leading the engraving head by this distance there is little risk of debris removed during the laser engraving process jamming between the support ring and the printing screen. When the support ring includes air outlet ports distributed around it the flow of air through the support ring helps to prevent debris from entering any space between the bearing surface of the support ring and the screen.

The end ring assemblies may also be formed similar to a scraper ring of the piston of an internal combustion engine or may be formed by inflatable cuffs. End rings of different nominal diameter are also preferably provided to enable the machine to accommodate printing cylinders of different diameter. Preferably a removable steady is provided for connection to the free end of the shaft, the removable steady being removed to enable the printing screens to be mounted on, and removed from the shaft.

BRIEF DESCRIPTION OF THE DRAWINGS

Two examples of laser engraving device in accordance with this invention will now be described with reference to the accompanying drawings, in which.

DESCRIPTION OF PREFERRED EXAMPLES

Figure 1:
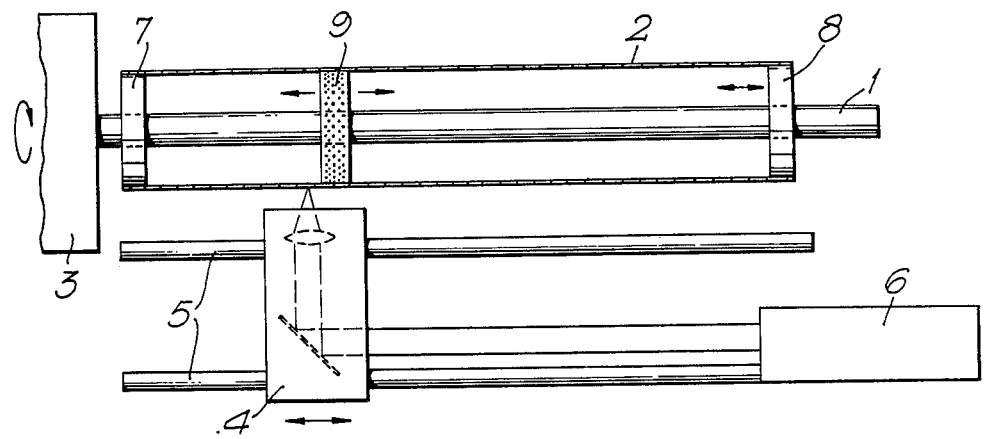
FIG. 1 is a diagrammatic plan view of a first example.
Figure 2:
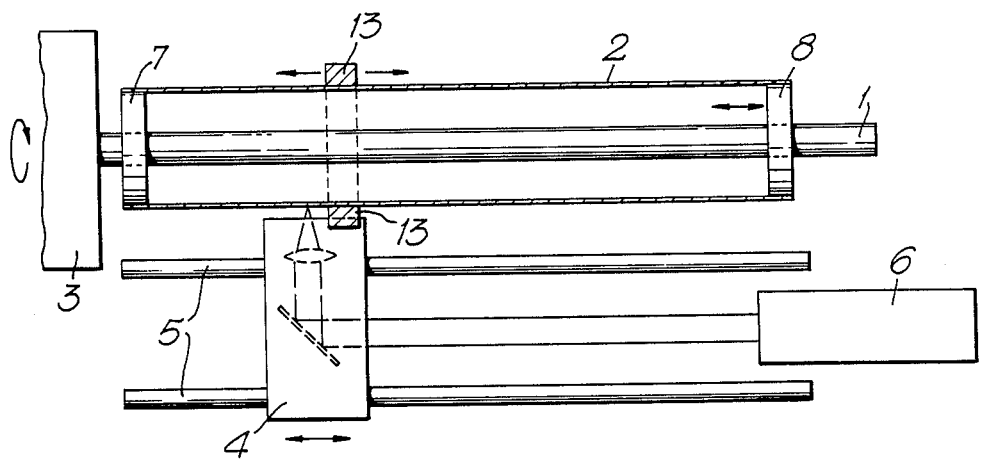
FIG. 2 is a diagrammatic plan view of a second example.

A laser engraving machine comprises a shaft 1 on which is mounted a cylindrical rotary printing screen 2, a rotary drive 3 for the shaft 1, a laser engraving head mounted on a carriage 4 running along a slide way 5, and a laser 6. To form an ink transmitting pattern on a rotary screen 2. The screen 2 is rotated about its longitudinal axis and then the laser engraving head on the carriage 4 is moved in the axial direction along the length of the screen 2. In this way, the laser engraving head describes a helical path over the surface of the rotary screen 2. Depending upon whether the laser is operating at any instant of time, lacquer is ablated from the surface of the screen to open up previously formed perforations in the screen 2.

The screen 2 is fixed onto the shaft 1 by end rings 7 and 8. The end ring 7 is typically fixed in position whereas the end ring 8 is movable along the shaft 1 to accommodate different lengths of printing screen 2. The end rings 7 and 8 typically include an inflatable cuff around their periphery to take up any tolerance in the circumferential dimension of the printing screen 2. A steady, not shown in detail, but which provides a journal bearing for the free end of the shaft 1, is fixed to the free end of the shaft 1 to support it after the screen 2 is located on it.

Figure 3:
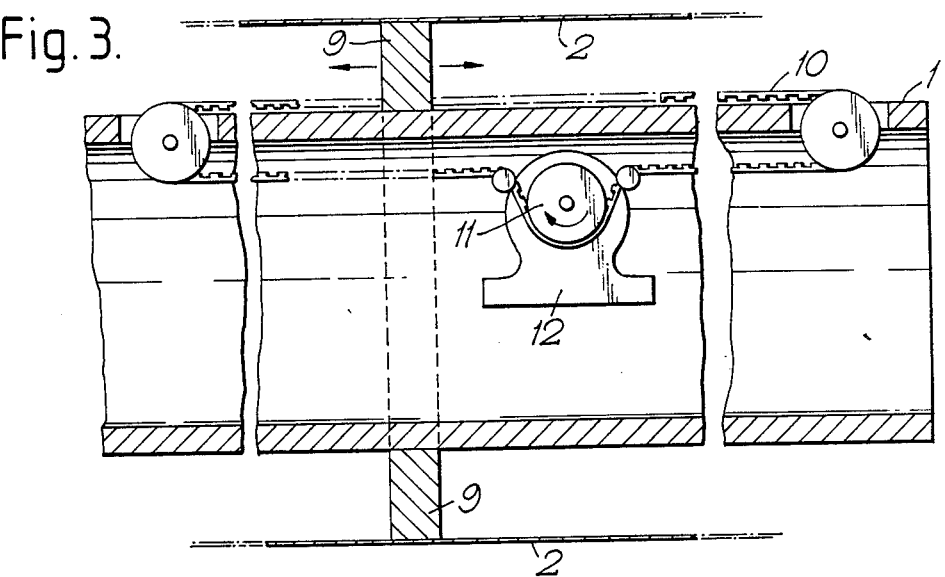
FIG. 3 is a vertical section through part of the first example.

The first example of engraving machine also includes an internal support ring 9 mounted on the shaft 1 and capable of being moved along the shaft 1 from one end to the other inside the screen 2. The support ring 9 is arranged to be a sliding fit within the rotary screen 2 and includes in its outer periphery a number of air outlet ports equally distributed around the periphery to provide an air cushion between the outer supporting surface of the support ring 9 and the inner surface of the screen 2. As a modification the support ring 9 may have a number of bearing surfaces around its periphery which are capable of moving radially inwards and outwards about the axis of rotation of the shaft 1. In this example, as shown in FIG. 3, the support ring 9 is connected to a toothed belt 10 driven via a pulley 11 from a motor 12. Also in this example a position detector (not shown) mounted on the carriage 4 and arranged to detect the position of the support ring 9 is arranged to control the operation of the motor 12 to move the support ring and keep it immediately in advance of the focus of the laser beam in the axial direction as the carriage 4 moves along the slide way 5 during engraving of the printing screen 2.

The second example of engraving device in accordance with this invention is generally similar to the first with the exception that, instead of the internal support ring 9, an external support ring 13 is included which has an internal cylindrical surface which supports the outside surface of the screen 2. Again this support surface is preferably formed with a number of air outlet ports which are supplied with air under pressure to provide an air cushion between the bearing surface of the ring 13 and the outer surface of the screen 2. Again, it is possible for the support surface of the external ring 13 to include a number of bearing pads movable radially inwards and outwards.

Figure 4:
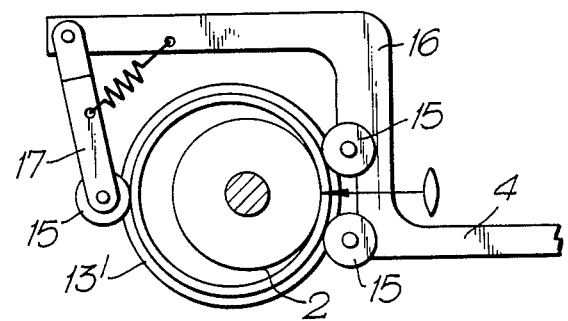
FIG. 4 is a cross-section through a modification of the second example.
Figure 5:
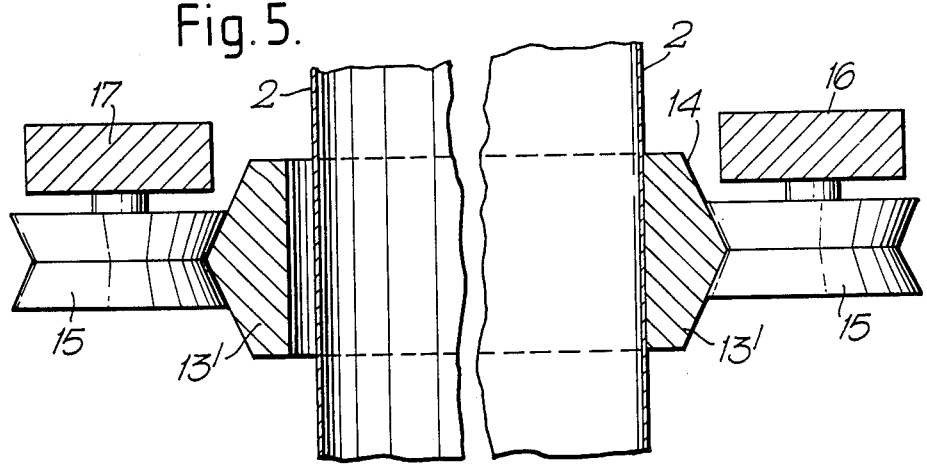
FIG. 5 is a horizontal cross-section drawn to a larger scale through the support ring and screen of the modification of the second example.

In a modification of the second example the support ring 13' has a diameter large enough to be a sliding fit on the outside of a screen 2 having the largest acceptable size within the tolerance band for a particular nominal size of screen. Typically the ring 13' has a diameter 1 mm larger than that of the largest acceptable size of screen 2. The support ring has a pitched outer surface 14 and is rotatably mounted between three freely rotatable grooved or diabolo shaped rollers 15. The rollers 15 are journalled onto a frame 16 mounted on the carriage 4 in a location in which the support surface of the ring 13 is adjacent the laser engraving head is at the location of the outside surface of a screen having the smallest acceptable size within the tolerance band for that particular nominal size of screen. Thus if the tolerance band is 300 microns the axis of the support ring is displaced from the axis of rotation of the shaft 1 by 150 microns in a direction away from the engraving head. The support ring 13' therefore engages the outer surface of the screen 2 adjacent the laser engraving head and supports it in a fixed position with respect to the carriage 4 and hence with respect of the engraving head and substantially concentric with the axis of rotation of the shaft 1. The circularity of the cross-section of the screen 2 is thus distorted. Typically the ring 13' makes contact with the screen 2 over about 120° of the circumference of the screen 2. The screen is sufficiently flexible for this distortion to be accommodated easily. The frame 16 includes a spring loaded arm 17 to enable the ring 13' to be changed easily for one having a different internal diameter to enable the machine to accommodate different sizes of screen 2. FIG. 4 illustrates the arrangement somewhat diagramatically with the size and eccentricity of the support ring 13' greatly exaggerated.

The laser engraving device in accordance with this invention enables the screens 2 to be changed rapidly and also ensures that the screen is always at a predetermined location with respect to the head of the engraving device during engraving. This results in high engraving quality. To accommodate a different size of printing screen it is necessary only to move the end ring 8 to accommodate longer screens or change perhaps both end rings 7 and 8 and include a spacer ring on the support ring 9 or 13 or a different support ring 13' to account for a different diameter of screen. The shaft 1 remains fixed for all diameters of screen and this facilitates the speed of changeover from the engraving of screens of one size to that of another and reduces the overall cost of the machine.

We claim:

1. A laser engraving machine for engraving rotary printing screens, said laser engraving machine including:
   a shaft having a first and second end and a longitudinal axis;
   a rotary drive, said rotary drive being connected to said first end of said shaft for, in use, rotating said shaft around its longitudinal axis;
   two end ring assemblies, said end ring assemblies being mounted on said shaft and at least one of said end ring assemblies being movable along said shaft, said end ring assemblies being arranged to locate and fix opposite ends of said rotary printing screen to said shaft,
   a laser engraving device including a head movable backwards and forwards parallel to said longitudinal axis of said shaft, said laser engraving device, in use, engraving said rotary printing screen mounted on said shaft; and,
   a support, said support being movable along said screen with said laser engraving head to provide local support for said screen whereby a part of said screen being engraved by said laser engraving device is supported at a constant predetermined position with respect to said head of said laser engraving device.

2. The laser engraving machine of claim 1, wherein said support includes a ring having a cylindrical supporting surface.

3. The laser engraving machine of claim 2, wherein said ring has a radius of curvature slightly different from that of said screen and has its centre offset from said axis of rotation of said shaft, whereby said ring deforms said screen in a radial direction in the region of said laser engraving head.

4. The laser engraving machine of claim 1, wherein said support includes a support surface having air outlet ports distributed around it, and wherein said machine also includes means to provide a flow of air through said outlet ports to provide an air cushion between said support and said printing screen.

5. The laser engraving machine of claim 2, wherein said support ring surrounds said printing screen and wherein said support ring is mounted on said laser engraving head and moves along said printing screen with said laser engraving head.

6. The laser engraving machine of claim 4, wherein said support ring surrounds said printing screen and wherein said support ring is mounted on said laser engraving head and moves along said printing screen with said laser engraving head.

7. The laser engraving machine of claim 6, wherein said support ring is sized whereby it is a sliding fit on the largest screen within a tolerance range, and wherein said means to supply air is arranged to emit sufficient air adjacent said engraving head to function as an effective air bearing and a greater quantity of air remote from said engraving head to push said screen towards said support adjacent said engraving head.

8. The laser engraving machine of claim 2, wherein said support ring is interchangeable to enable the diameter of its support surface to be adjusted whereby said laser engraving machine accommodates printing screens of different nominal diameter.

9. The laser engraving machine of claim 5, wherein said support ring has a diameter larger than that of said screen and is mounted whereby it rotates with said screen and has its centre displaced from said axis of said shaft whereby said ring urges said screen radially inwards and makes it conform to said cylindrical support surface of said ring in said part of said screen being engraved.

10. The laser engraving machine of claim 9, wherein said machine also includes:
   a frame, said frame being mounted on said engraving head; and,
   journalling means connected to said frame and journalling said support ring whereby said support ring is freely rotatable in said frame.

* * * * *